United States Patent
Ikuta et al.

(10) Patent No.: US 8,547,119 B2
(45) Date of Patent: Oct. 1, 2013

(54) DYNAMIC QUANTITY DETECTION DEVICE

(75) Inventors: Toshio Ikuta, Handa (JP); Shunji Mase, Handa (JP); Seiya Ide, Okazaki (JP)

(73) Assignee: DENSO CORPORATION, Kariya (JP)

( * ) Notice: Subject to any disclaimer, the term of this patent is extended or adjusted under 35 U.S.C. 154(b) by 392 days.

(21) Appl. No.: 12/923,539

(22) Filed: Sep. 28, 2010

(65) Prior Publication Data

US 2011/0109330 A1    May 12, 2011

(30) Foreign Application Priority Data

Nov. 9, 2009    (JP) ................................. 2009-256465

(51) Int. Cl.
*G01R 27/26* (2006.01)

(52) U.S. Cl.
USPC ............ 324/686; 324/548; 324/549; 324/550

(58) Field of Classification Search
USPC .............. 324/686, 548–550; 340/449, 10.33, 340/5.1
See application file for complete search history.

(56) References Cited

U.S. PATENT DOCUMENTS

| | | | |
|---|---|---|---|
| 5,978,412 A | 11/1999 | Takai | |
| 6,266,588 B1 | 7/2001 | McClellan et al. | |
| 2003/0164043 A1 | 9/2003 | Murata et al. | |
| 2006/0082451 A1* | 4/2006 | Shaw | 340/449 |
| 2008/0022762 A1* | 1/2008 | Skurnik | 73/146.5 |
| 2008/0058032 A1* | 3/2008 | Yamaji et al. | 455/574 |
| 2008/0204262 A1 | 8/2008 | Shimizu | |
| 2008/0303654 A1* | 12/2008 | Kates | 340/539.3 |
| 2008/0319606 A1* | 12/2008 | Fortson et al. | 701/35 |
| 2009/0224869 A1* | 9/2009 | Baker et al. | 340/5.1 |
| 2010/0141399 A1* | 6/2010 | Swope | 340/10.33 |
| 2011/0035115 A1* | 2/2011 | Schumacher | 701/45 |
| 2012/0326487 A1* | 12/2012 | Tonbe | 297/475 |

FOREIGN PATENT DOCUMENTS

| | | |
|---|---|---|
| JP | A-11-059323 | 3/1999 |
| JP | A-2004-268628 | 9/2004 |
| JP | A-2004-284422 | 10/2004 |
| JP | A-2004-136811 | 5/2005 |
| JP | A-2007-171057 | 7/2007 |

OTHER PUBLICATIONS

Office Action mailed Dec. 20, 2011 issued in corresponding JP patent application No. 2009-256465 (English translation enclosed).

* cited by examiner

*Primary Examiner* — Jermele M Hollington
*Assistant Examiner* — Adam Clarke
(74) *Attorney, Agent, or Firm* — Posz Law Group, PLC

(57) ABSTRACT

A dynamic quantity detection device includes a detection portion, a signal process portion, and an operation mode switch portion. The detection portion detects a dynamic quantity applied from an outside and generates a sensor signal in accordance with the dynamic quantity. The signal process portion processes the sensor signal from the detection portion to have a property suitable for an external device. When the sensor signal output from the detection portion is less than or equal to a predetermined threshold value, the operation mode switch portion sets an operation mode to a power save mode by stopping an operation of the signal process portion. When the sensor signal output from the detection portion is greater than the predetermined threshold value, the operation mode switch portion switches the operation mode to a normal mode by activating the signal process portion.

7 Claims, 3 Drawing Sheets

DYNAMIC QUANTITY DETECTION DEVICE

CROSS REFERENCE TO RELATED APPLICATIONS

The present application is based on and claims priority to Japanese Patent Application No. 2009-256465 filed on Nov. 9, 2009, the contents of which are incorporated in their entirety herein by reference.

BACKGROUND OF THE INVENTION

1. Field of the Invention

The present invention relates to a dynamic quantity detection device that detects a dynamic quantity.

2. Description of the Related Art

Conventionally, as a dynamic quantity detection device that detects a dynamic quantity such as acceleration and pressure, various types of dynamic quantity detection device including a capacitance type and a piezoelectric type are disclosed, for example, in US 2003/0164043 A1 (corresponding to JP-A-2003-248016) and JP-A-2007-171057. A capacitance-type dynamic quantity detection device includes a sensor element whose capacitance changes with the dynamic quantity, converts the capacitance of the sensor element into a voltage signal with a C-V converter circuit, and outputs the converted signal as a sensor signal. A piezoelectric-type dynamic quantity detection device includes a piezoelectric element as a sensor element.

These kind of dynamic quantity detection devices are used, for example, in an airbag system of a vehicle, as an acceleration sensor or a pressure sensor for detecting a collision of the vehicle. In an air bag system disclosed in JP-A-2004-284422, when a sensor signal from an acceleration sensor is greater than a threshold value, it is determined that the vehicle is in danger of collision, and a control device including a microcomputer is activated. In a normal state where the sensor signal is not greater than the threshold value, an operation of the control device is stopped (i.e., sleep) so as to save a power consumption of the control device and achieve a power saving of the airbag system.

In a case where a sensor signal from a dynamic quantity detection device is input to a control device like the above-described airbag system, there is an issue that when a signal level of the sensor signal is greater than a dynamic range of an input system of the control device, the sensor signal is clamped to the maximum value of the dynamic range, a dynamic quantity is difficult to be detected at the control device when the sensor signal is large, and a collision of the vehicle cannot be predicted or determined with accuracy.

If the dynamic range of the sensor signal is adjusted in such a manner that the maximum value of the sensor signal output from the dynamic quantity detection device corresponds to the dynamic range of the input system of the control device in order to solve the above-described issue, the sensor signal may be too small at a range where the dynamic quantity is required to be detected at the control device with accuracy, and a detection accuracy of the dynamic quantity is reduced.

Thus, the dynamic quantity detection device normally includes a signal processing circuit, such as an amplifier circuit and a low pass filter, that processes the sensor signal obtained through the sensor element, adjusts the dynamic range of the sensor signal to the dynamic range of the input system, and largely changes the sensor signal at a region where a detection accuracy of the dynamic quantity is required.

In a control system including this kind of dynamic quantity detection device, in particular, in a control system including a plurality of dynamic quantity detection devices, the amount of power consumption of the whole system is increased due to the amount of power consumed at the dynamic quantity detection device. In order to achieve a power saving of the control system, it is required to reduce the power consumption of the dynamic quantity detection device as well as the power consumption of the control device.

The dynamic quantity detection device detects the dynamic quantity, such as acceleration and pressure, applied to a detection object, such as a vehicle, and outputs the sensor signal. In addition, the dynamic quantity detection device needs to output the sensor signal without response delay when the dynamic quantity changes. Thus, conventionally, an internal circuit such as the signal processing circuit is constantly activated.

As a result, in a conventional dynamic quantity detection device, a power consumption of the internal circuit such as the signal processing circuit is difficult to be reduced sufficiently, and thereby the power saving of the control system including the dynamic quantity control device is restricted.

SUMMARY OF THE INVENTION

In view of the foregoing problems, it is an object of the present invention to provide a dynamic quantity detection device that can output a sensor signal without response delay when a dynamic quantity changes and can reduce a power consumption.

A dynamic quantity detection device according to a first aspect of the present invention includes a detection portion, a signal process portion, and an operation mode switch portion. The detection portion detects a dynamic quantity applied from an outside and, generates a sensor signal in accordance with the dynamic quantity. The signal process portion processes the sensor signal from the detection portion to have a property suitable for an external device. The operation mode switch portion switches an operation mode. When the sensor signal output from the detection portion is less than or equal to a predetermined threshold value, the operation mode switch portion sets the operation mode to a power save mode by stopping an operation of the signal process portion. When the sensor signal output from the detection portion is greater than the predetermined threshold value, the operation mode switch portion switches the operation mode to a normal mode by activating the signal process portion.

The dynamic quantity detection device according to the first aspect can output the sensor signal without response delay when the dynamic quantity is greater than the threshold value and can reduce a power consumption.

A dynamic quantity detection device according to a second aspect of the present invention includes a detection portion, a signal process portion, a detection switch, and an operation mode switch portion. The detection portion detects a dynamic quantity applied from an outside and generates a sensor signal in accordance with the dynamic quantity. The signal process portion processes the sensor signal from the detection portion to have a property suitable for an external device. The detection switch becomes an on-state when the dynamic quantity applied to the detection means is greater than a predetermined threshold value. The operation mode switch portion switches an operation mode. When the detection switch is in an off-state for a predetermined time, the operation mode switch portion sets the operation mode to a power save mode by stopping operations of the detection portion and the signal process portion. When the detection switch becomes the on-state, the operation mode switch portion switches the operation mode to a normal mode by activating the detection portion and the signal process portion.

The dynamic quantity detection device according to the second aspect can output the sensor signal without response delay when the dynamic quantity is greater than the threshold value and can reduce a power consumption.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

Figure 1:
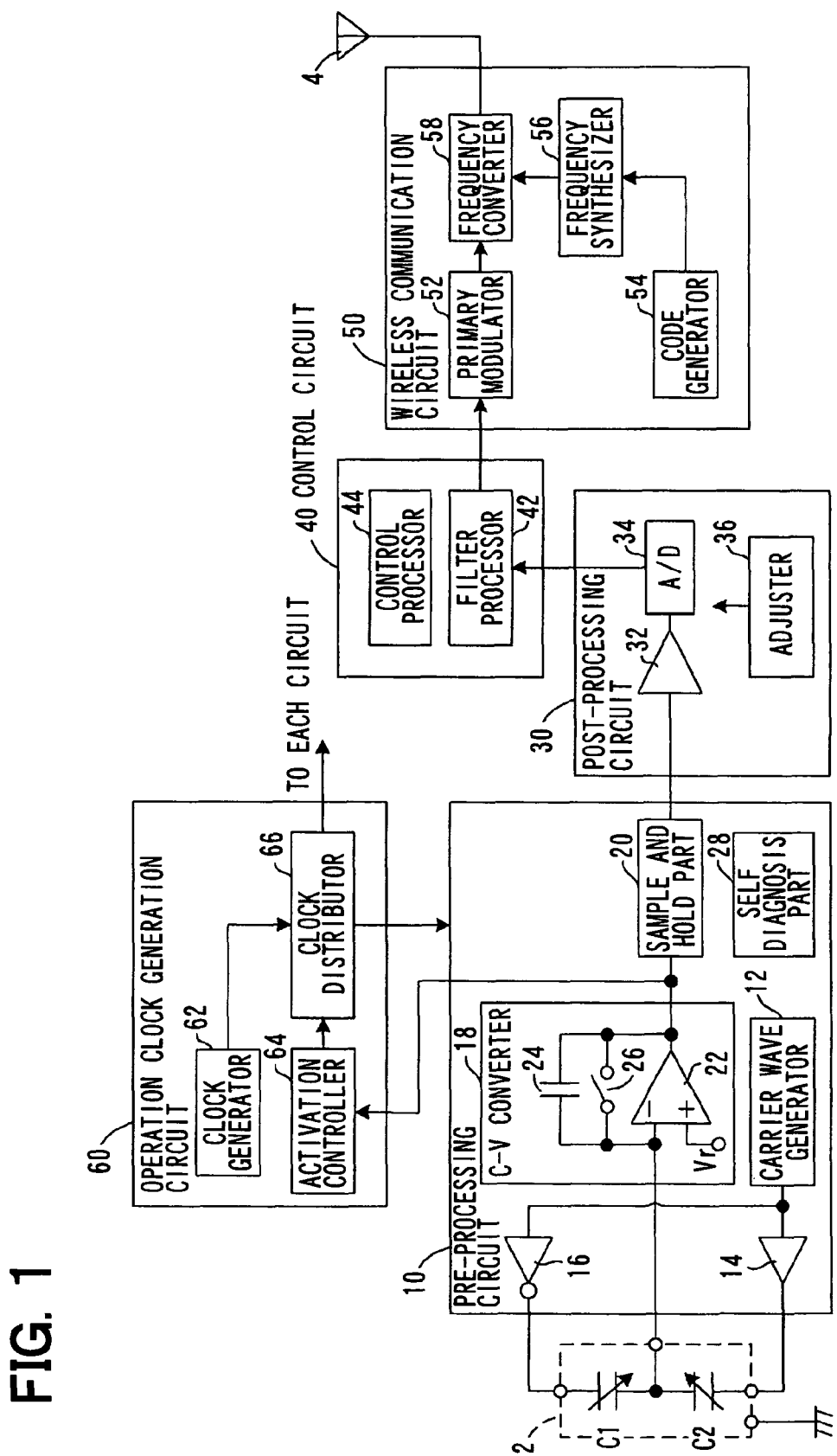
FIG. 1 is a block diagram showing an acceleration detection device according to an embodiment of the present invention.

An acceleration detection device according to an embodiment of the present invention will be described with reference to FIG. 1. The acceleration detection device is disposed at a front part or a pillar of a vehicle as a satellite sensor of an airbag control device for inflating an airbag provided to a driver seat or a passenger seat of the vehicle so as to detect an impact applied to a vehicle body at each disposed position. The acceleration detection device includes a sensor element 2. The sensor element 2 is a capacitance type and a capacitance of the sensor element 2 changes in accordance with acceleration.

The sensor element 2 is a known sensor element disclosed, for example, in US 2003/0164043 A1. The sensor element 2 includes a comb-shaped movable electrode and two comb-shaped fixed electrodes. The fixed electrodes are arranged opposite the movable electrode so that capacitances C1 and C2 are provided between the fixed electrodes and movable electrode, respectively, and the capacitances C1 and C2 changes when the movable electrode is applied with an external force and displaces. The sensor element 2 is coupled with a pre-processing circuit 10. The pre-processing circuit 10 detects a capacitance difference (C1−C2) of the capacitances C1 and C2 and outputs a detected result as a sensor signal.

The pre-processing circuit 10 includes a carrier wave generator 12, buffers 14 and 16, a C-V converter 18, a sample and hold part 20, and a self diagnosis part 28. The carrier wave generator 12 generates a carrier wave for detecting the capacitances. The buffers 14 and 16 apply the carrier wave (voltage: 0 to Vcc) from the carrier wave generator 12 to the two fixed electrodes of the sensor element 2, respectively, in opposite phase. The C-V converter 18 is coupled with the fixed electrodes and generates a voltage signal in accordance with the capacitance difference (C1−C2). The sample and hold part 20 samples and holds the voltage signal from the C-V converter 18 and outputs as a sensor signal.

The C-V converter 18 includes a differential amplifier circuit 22, a capacitor 24, and a switching element 26. The amplifier circuit 22 includes an inverting input terminal, a non-inverting input terminal, and an output terminal. The inverting terminal is coupled with the movable electrode of the sensor element 2. The non-inverting input terminal is applied with a reference voltage Vr (=Vcc/2). The capacitor 24 (capacitance: Cf) is coupled between the inverting input terminal and the output terminal of the differential amplifier circuit 22. The switching element 26 is coupled in parallel with the capacitor 24. The C-V converter 18 generates the voltage signal Vo (=(C1−C2)·Vcc/Cf) in accordance with the capacitance difference (C1−C2) of the capacitances C1 and C2 by turning on and off the switching element 26 at a predetermine time with a driving circuit (not shown).

The self diagnosis part 28 is activated periodically, for example, twice a day, displaces the movable electrode of the sensor element 2 and determines whether the sensor signal normally changes. Because the self diagnosis part 28 is not a main part of the present invention, a detailed description of the self diagnosis part 28 will be omitted.

The sensor signal output from the sample and hold part 20 of the pre-processing, circuit 10 is input to a post-processing circuit 30. The post-processing circuit 30 includes an amplifier circuit 32, and A/D converter 34, and an adjuster 36. After the sensor signal is amplified at the amplifier circuit 32, the sensor signal is converted into digital data at the ND converter 34.

The adjuster 36 performs initial settings of an amplification factor (gain) of the amplifier circuit 32 and an offset value of the ND converter 34 based on an order from a control circuit 40.

The sensor signal converted into the digital data in the post-processing circuit 30 is input to the control circuit 40. The control circuit 40 includes a microcomputer. The microcomputer can function as a filter processor 42 and a control processor 44 by executing programs. The sensor signal is treated with a filter processing by the filter processor 42 and is output to a wireless communication circuit 50.

The sensor signal input through the post-processing circuit 30 is a collision raw waveform. The filter processor 42 treats the sensor signal with filter processing with a low pass filter formed of a Bessel filter and thereby converting (i.e., flattening) the sensor signal into a sensor signal that is appropriate to be wirelessly transmitted from the wireless communication circuit 50 to an airbag control device (not shown).

The control processor 44 executes control processes other than the filter process. For example, the control processor 44 executes an initial setting process and an abnormality informing process. In the initial setting process, the control processor 44 initializes, for example, the adjuster 36 of the post-processing circuit 30. In the abnormality informing process, when an abnormality of the sensor element 2 is detected at the self diagnosis part 28 in the pre-processing circuit 10, the control processor 44 informs the airbag control device of the abnormality through the wireless communication circuit 50.

The wireless communication circuit 50 includes a primary demodulator 52, a code generator 54, a frequency synthesizer 56, and a frequency converter 58. The primary demodulator 52 puts the digital data for transmission, such as the sensor signal, output from the control circuit 40 on the carrier wave for transmission. The code generator 54 generates a spread code. The frequency synthesizer 56 generates a high frequency signal (broadband random signal) correspondingly with the spread code generated at the code generator 54. The frequency converter 58 spreads a spectrum of the transmission signal to broadband by combining the transmission signal with the high frequency signal output from the frequency synthesizer 56. A signal output from the frequency converter 58 is wirelessly transmitted to the airbag control device through an antenna 4.

As described above, in the acceleration detection device according to the present embodiment, the capacitances of the sensor element 2 that change in accordance with acceleration (specifically, the capacitance difference C1–C2) is converted into the sensor signal in the pre-processing circuit 10 including the C-V converter 18. The sensor signal is amplified and A/D converted in the post-processing circuit 30. The A/D converted sensor signal (digital data) is input to the control circuit 40 and is filter-processed at the filter processor 42 of the control circuit 40. Then, the filter-processed sensor signal (digital data) is wirelessly transmitted from the wireless communication circuit 50 to the airbag control device by a spread spectrum method.

Thus, the acceleration detection device according to the present embodiment does not need to be coupled with the airbag control device through a signal line. In a case where a battery is built in the acceleration detection device and power is applied from the built-in battery to each part, the acceleration detection device can be disposed at a desired position without pulling a signal line and a power source line out of the acceleration detection device.

However, in this case, because the acceleration detection device cannot be supplied with power from an outside, in order to operate the acceleration detection device for a long time, it is required to reduce electric energy consumed at each part and restrict consumption of the battery.

The acceleration detection device according to the present embodiment further includes an operation clock generation circuit 60 that supplies an operation clock signal to each of the pre-processing circuit 10, the post-processing circuit 30, the control circuit 40, and the wireless communication circuit 50. The operation clock generation circuit 60 includes a clock generator 62, an activation controller 64, and a clock distributor 66. The activation controller 64 switches supply and stop of the operation clock signal to each circuit other than the pre-processing circuit 10, that is, the post-processing circuit 30, the control circuit 40, and the wireless communication circuit 50.

The clock generator 62 generates the operation clock signal for operating each of the pre-processing circuit 10, the post-processing circuit 30, the control circuit 40, and the wireless communication circuit 50. The clock distributor 66 distributes the operation clock signal generated by the clock generator 62 to each of the pre-processing circuit 10, the post-processing circuit 30, the control circuit 40, and the wireless communication circuit 50.

Figure 2A:
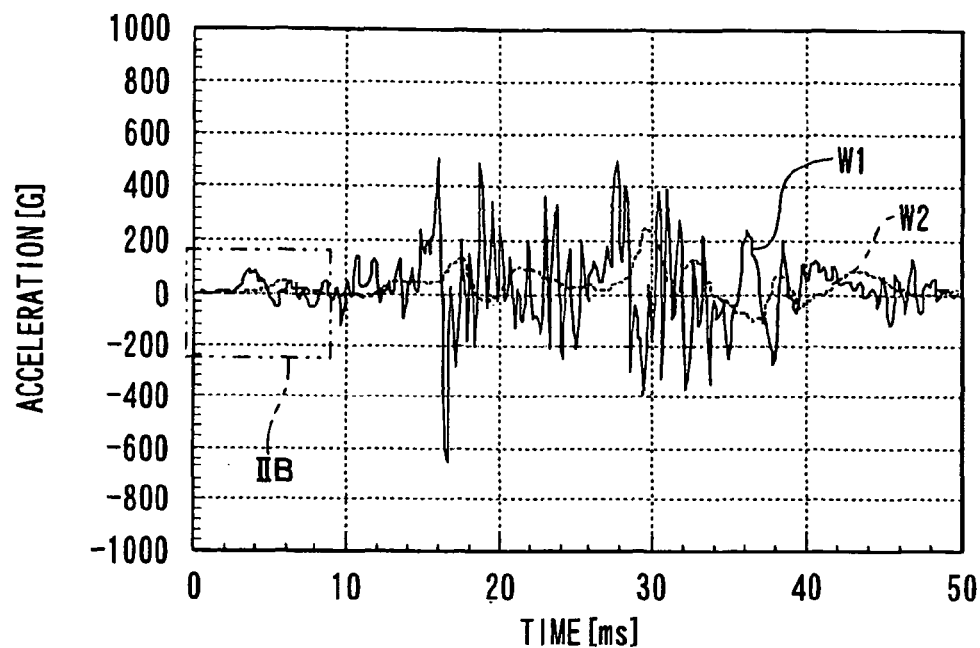
FIG. 2A is a waveform chart showing a sensor signal (W1) and a transmission signal (W2)
Figure 2B:
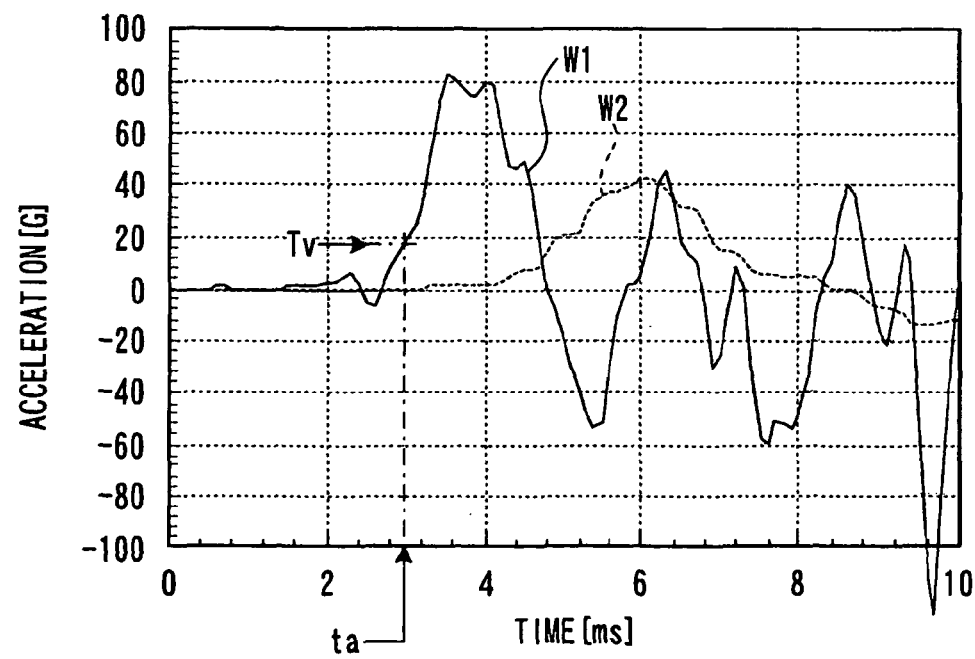
FIG. 2B is an enlarged view of a portion IIB of FIG. 2A showing a relationship between the sensor signal and an activation time.

The activation controller 64 captures the sensor signal output from the C-V converter 18 of the pre-processing circuit 10, that is, the collision raw waveform obtained through the sensor element 2. When a voltage of the captured sensor signal exceeds a predetermined threshold value Tv, the activation controller 64 determines there is a possibility that the vehicle collides and supplies the operation clock signal from the clock distributor 66 to the post-processing circuit 30, the control circuit 40, and the wireless communication circuit 50 so as to activate each of the circuits 30, 40, 50. In an example shown in FIG. 2B, the threshold value Tv is a voltage corresponding to an acceleration of about 18 G, and the post-processing circuit 30, the control circuit 40, and the wireless communication circuit 50 are activated at time "ta".

Until the sensor signal (W1) output from the C-V converter 18 reaches the threshold value Tv, the acceleration detection device operates in a power save mode in which only the operation clock generation circuit 60 and the pre-processing circuit 10 operate. When the sensor signal (W1) reaches the threshold value Tv, an operation mode of the acceleration detection device is switched by the activation controller 64 to a normal mode in which all the circuits in the acceleration detection device are activated and a series of processes such as the amplification, the A/D conversion, the filter processing, and the wireless transmission of the sensor signal are executed.

Thus, the acceleration detection device according to the present embodiment can restrict the operation of the post-processing circuit 30, the control circuit 40, and the wireless communication circuit (eventually, the electric consumption at each of the circuits 30, 40, 50) to the minimum necessary and the electric consumption of the acceleration detection device can be reduced.

Therefore, in a case where the acceleration detection device is operated with a built-in battery, a consumption of the battery can be restricted and a life of the acceleration detection device can be made longer. In a case where power is supplied from an in-vehicle battery to the acceleration detection device, a power consumption of the in-vehicle battery can be restricted.

Furthermore, in the present embodiment, when the sensor signal (collision raw waveform shown in FIG. 2) obtained at the C-V converter 18 exceeds the threshold value not when the filter-processed sensor signal (transmission signal shown in FIG. 2) exceeds the threshold value, the acceleration detection device determines there is a possibility that the vehicle collides and activates the post-processing circuit 30, the control circuit 40 and the wireless communication circuit 50. Thus, the sensor signal for airbag inflation determination, that is, the sensor signal for collision determination can be transmitted to the airbag control device, which is an external device, without a response delay.

Thus, a responsiveness of the airbag control is not reduced even when the operation of each of the post-processing circuit 30, the control circuit 40 and the wireless communication circuit 50 is stopped until the sensor signal (collision raw waveform) obtained at the C-V converter 18 reaches the threshold value.

In the present embodiment, supply channels of the clock signal of the clock distributor 66 to the wireless communication circuit 50 are different between the code generator 54 and a group of the primary demodulator 52, the frequency synthesizer 56 and the frequency converter 58. From the clock distributor 66 to the code generator 54, the clock signal is constantly supplied regardless of the switching of the operation mode by the activation controller 64, and the code generator 54 constantly generates the spread code in synchronization with the clock signal.

This is for synchronizing a generation timing of the spread code at the code generator 54 and a generation timing of the spread signal at a receiving device side provided in the airbag control device, and thereby normally decoding the filter-processed sensor signal (digital data) at the airbag control device side.

After the activation controller 64 determines that the sensor signal (collision raw waveform) from the C-V converter 18 exceeds the threshold value and the activates each of the circuits 30, 40, 50, the activation controller 64 maintains the operation of the each of the circuits 30, 40, 50 until the sensor signal (collision raw waveform) converges at a value less than or equal to the threshold value.

When the sensor signal (collision raw waveform) converges at a value less than or equal to the threshold value for a predetermined time, the activation controller 64 stops the output of the clock signal to each of the circuits 30, 40, 50 so as to stop the operation of each of the circuits 30, 40, 50, and thereby switching the operation mode of the acceleration detection device to the power save mode.

In the normal mode where each of the circuits 30, 40, 50 operates, the sensor signal (digital date) is input from the post-processing circuit 30 to the control circuit 40 periodically (for example, every 500 μs), and the sensor signal is filter-processed and is wirelessly transmitted to the airbag control device.

The activation controller 64 operates each of the circuits 30, 40, 50 temporarily when an abnormality of the sensor element 2 is detected at the self diagnosis part 28 of the pre-processing circuit 10 and when a predetermine period (for example, 10 minutes) counted at a watchdog timer (not shown) for monitoring the operation of the acceleration detection device at the airbag control device elapses, and data (self diagnosis result) indicating the abnormality of the sensor element 2 and the filter-processed sensor signal are wirelessly transmitted from the wireless communication circuit 50 to the airbag control device.

The activation controller 64 periodically operates each of the circuits 30, 40, 50 and the sensor signal is periodically wirelessly transmitted to the sensor signal so that when the acceleration detection device according to the present embodiment breaks down and cannot wirelessly transmit the sensor signal, the breakdown of the acceleration detection device is detected at the airbag control device side and, for example, a repair of the acceleration detection device can be performed immediately.

In the present embodiment, the C-V converter 18 in the pre-processing circuit 10 can function as a conversion portion, and the C-V converter 18 and the sensor element 2 can function as a detection portion. The post-processing circuit 30 and the control circuit 40 can function as a signal process portion, the wireless communication circuit 50 can function as a communicating portion, the activation controller 64 in the operation clock generation circuit 60 can function as a operation mode switch portion, and the code generator 54 in the wireless communication circuit 50 can function as a code generation portion, and the self diagnosis part 28 can function as a diagnosis portion.

Although the present invention has been fully described in connection with the preferred embodiments thereof with reference to the accompanying drawings, it is to be noted that various changes and modifications will become apparent to those skilled in the art.

Figure 3:
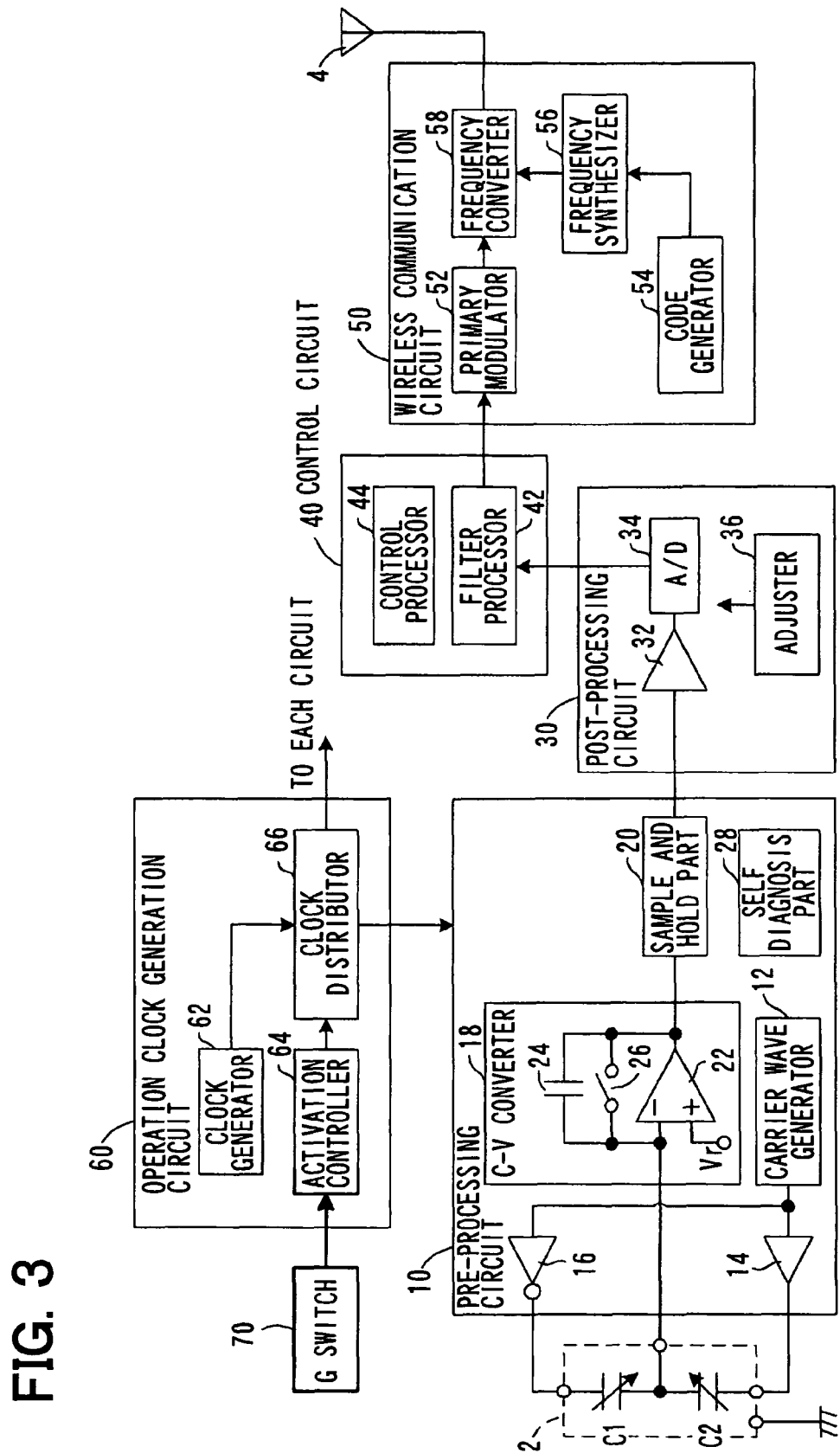
FIG. 3 is a block diagram showing an acceleration detection device according to a modification of the present invention.

In the above-described embodiment, when the sensor signal output from the C-V converter 18 exceeds the threshold value, the activation controller 64 determines there is a possibility that the vehicle collides and activates the post-processing circuit 30, the control circuit 40, and the wireless communication circuit 50, as an example. As shown in FIG. 3, the acceleration detection device may include an acceleration detection switch (G switch) 70 aside from the sensor element 2. When the acceleration detected at the sensor element 2 exceeds the threshold value, a contact point of the G switch 70 becomes an on-state due to a movement of a spindle. When the G switch 70 becomes the on-state, the clock signal is supplied from the clock distributor 66 to the pre-processing circuit 10, the post-processing circuit 30, the control circuit 40, and the wireless communication circuit 50 so as to activate each of the circuits 10, 30, 40, 50.

In the present case, the pre-processing circuit 10 can be operated only when it is necessary to transmit the sensor signal detected at the sensor element 2 to the airbag control device. Thus, the power consumption of the acceleration detection device can be reduced further than the above-described embodiment.

In a case where the acceleration detection device is configured as shown in FIG. 3, the pre-processing circuit 10 is activated under a control of the activation controller 64. Thus, in a manner similar to the above-described embodiment, when the self-diagnosis part 28 is provided in the pre-processing circuit 10, the activation controller 64 may input the clock signal to the pre-processing circuit 10 and may activate the pre-processing circuit 10 periodically (for example, twice a day), and when the pre-processing circuit 10 is activated, the self diagnosis part 28 self-diagnoses the operation of the sensor element 2.

In the above-described embodiment, when the operation of each of the circuits in the acceleration detection device is stopped and the power consumption is reduced, the activation controller 64 stops the supply of the clock signal (operation clock) to the circuits, as an example. The operation of the circuits may also be stopped by cutting of the power supply channel to the circuits.

In the above-described embodiment, the acceleration detection device used as a satellite sensor of an airbag control device is described as an example of a dynamic quantity detection device. The dynamic quantity detection device may be any device including a sensor for detecting a dynamic quantity. For example, the dynamic quantity detection device may also be a pressure detection device for detecting a pressure or an angular velocity detection device for detecting an angular velocity. The sensor for detecting a dynamic quantity is not limited to a capacitance-type and may also be another detection type sensor including the above-described piezoelectric-type sensor.

The application of the dynamic quantity detection device is not limited to a device for detecting a dynamic quantity applied to a vehicle body of a vehicle. The present invention can also be applied to a device for detecting a clog of a filter, for example, at a DPF (Diesel Particulate Filter) provided in an exhaust system of a diesel engine or an air cleaner provided in an intake system of an engine or a device for detecting a dynamic quantity applied to each portion of a machine tool and a robot in a manner similar to the above-described embodiment.

In the above-described embodiment, the wireless communication circuit 50 of a spread spectrum method is provided in the acceleration detection device, and the filter-processed sensor signal is wirelessly transmitted to the airbag control device which is an external device, as an example. The dynamic quantity detection device according to the present invention does not always need a wireless communication circuit and the filter-processed sensor signal may also be transmitted to the external device through a communication line.

In the present case, power may be supplied from the external device to the dynamic quantity detection device. Even in the present case, the power consumption of the dynamic quantity detection device according to the present invention can be reduced compared with the conventional dynamic quantity detection device. Thus, a power consumption of the whole system including the dynamic quantity detection device and the external device can be reduced.

In the above-described embodiment, the sensor signal is amplified and filter-processed in the post-processing circuit 30 and the control circuit 40 as the signal process portion, respectively, for compensating the sensor signal to have a signal level and properties suitable for the airbag control device as an external device to receive and decode the sensor signal for the collision determination. A circuit configuration of the signal processing portion may be set based on a dynamic quantity to be detected and a specification of an external device for receiving the sensor signal.

Thus, the signal processing portion is configured at least to process the sensor signal obtained by various kinds of dynamic quantity sensor to have a property suitable to be input (transmitted) to an external device that is an output end. For example, the signal process portion may execute one or a combination of various kinds of processes including an amplification process, an attenuation process, a filter process, and a waveform shaping process.

What is claimed is:

1. A dynamic quantity detection device comprising:
    a detection portion configured to detect a dynamic quantity applied from an outside and generate a sensor signal in accordance with the dynamic quantity;
    a signal process portion configured to process the sensor signal from the detection portion to have a property suitable for an external device;
    a communication portion configured to transmit the sensor signal that is processed by the signal process portion to the external device; and
    an operation mode switch portion configured to switch an operation mode, wherein
    when the sensor signal output from the detection portion is less than or equal to a predetermined threshold value, the operation mode switch portion sets the operation mode to a power save mode by stopping an operation of the signal process portion,
    when the sensor signal output from the detection portion is greater than the predetermined threshold value, the operation mode switch portion switches the operation mode to a normal mode by activating the signal process portion,
    in the power save mode, the operation mode switch portion stops an operation of the communication portion,
    in the normal mode, the operation mode switch portion operates the communication portion, and
    the operation mode switch portion is configured to periodically switch the operation mode from the power save mode to the normal mode so that the sensor signal that is processed by the signal process portion is periodically transmitted from the communication portion.

2. A dynamic quantity detection device comprising:
    a detection portion configured to detect a dynamic quantity applied from an outside and generate a sensor signal in accordance with the dynamic quantity;
    a signal process portion configured to process the sensor signal from the detection portion to have a property suitable for an external device;
    a communication portion configured to transmit the sensor signal that is processed by the signal process portion to the external device;
    a detection switch becomes an on-state when the dynamic quantity applied to the detection switch is greater than a predetermined threshold value; and
    a operation mode switch portion configured to switch an operation mode, wherein
    when the detection switch is in an off-state for a predetermined time, the operation mode switch portion sets the operation mode to a power save mode by stopping operations of the detection portion and the signal process portion,
    when the detection switch becomes the on-state, the operation mode switch portion switches the operation mode to a normal mode by activating the detection portion and the signal process portion,
    in the power save mode, the operation mode switch portion stops an operation of the communication portion,
    in the normal mode, the operation mode switch portion operates the communication portion, and
    the operation mode switch portion is configured to periodically switch the operation mode from the power save mode to the normal mode so that the sensor signal that is processed by the signal process portion is periodically transmitted from the communication portion.

3. The dynamic quantity detection device according to claim 1, wherein
    the detection portion includes a capacitive sensor, and
    the capacitive sensor includes a sensor element whose capacitance changes with the dynamic quantity and a conversion portion configured to change the capacitance of the sensor element to the sensor signal.

4. The dynamic quantity detection device according to claim 1, wherein
    the detection portion is one of an acceleration sensor for detecting acceleration as the dynamic quantity and a pressure sensor for detecting pressure as the dynamic quantity.

5. The dynamic quantity detection device according to claim 1, further comprising
    a diagnosis portion configured to diagnose whether the detection portion normally operates, wherein
    the communication portion is configured to periodically transmit a diagnosis result by the diagnosis portion to the external device.

6. The dynamic quantity detection device according to claim 1, wherein
    the communication portion is configured to wirelessly transmit the sensor signal that is processed by the signal process portion to the external device.

7. The dynamic quantity detection device according to claim 6, wherein
    the communication portion includes a code generation portion configured to generate a spread code,
    the communication portion is configured to output the sensor signal while spreading the sensor signal to a broadband using the spread code, and
    the code generation portion is configured to constantly operate and generate the spread code regardless of the switching of the operation mode by the operation mode switch portion.

* * * * *